(12) United States Patent
Bailey et al.

(10) Patent No.: US 11,128,618 B2
(45) Date of Patent: Sep. 21, 2021

(54) EDGE DATA CENTER SECURITY SYSTEM THAT AUTONOMOUSLY DISABLES PHYSICAL COMMUNICATION PORTS ON DETECTION OF POTENTIAL SECURITY THREAT

(71) Applicant: DELL PRODUCTS, L.P., Round Rock, TX (US)

(72) Inventors: Mark M. Bailey, Round Rock, TX (US); Tyler B. Duncan, Austin, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 164 days.

(21) Appl. No.: 16/653,924

(22) Filed: Oct. 15, 2019

(65) Prior Publication Data

US 2021/0112054 A1 Apr. 15, 2021

(51) Int. Cl.
*H04L 29/06* (2006.01)

(52) U.S. Cl.
CPC .......... *H04L 63/0853* (2013.01); *H04L 63/10* (2013.01)

(58) Field of Classification Search
CPC ............................ H04L 63/0853; H04L 63/10
See application file for complete search history.

(56) References Cited

U.S. PATENT DOCUMENTS

| | | | |
|---|---|---|---|
| 7,971,446 B2 | 7/2011 | Clidaras et al. | |
| 8,862,803 B2 | 10/2014 | Powers et al. | |
| 9,858,795 B1 | 1/2018 | Gomes et al. | |
| 9,913,409 B2 | 3/2018 | Cutler et al. | |
| 10,026,302 B1 | 7/2018 | Bacco et al. | |
| 10,275,999 B2 | 4/2019 | Cohn et al. | |
| 10,779,432 B1* | 9/2020 | Duncan | H04L 9/0891 |
| 2009/0229194 A1 | 9/2009 | Armillas | |
| 2010/0223669 A1 | 9/2010 | Vermeulen et al. | |
| 2010/0235914 A1* | 9/2010 | Proulx | H04L 12/4641 726/23 |
| 2015/0363590 A1* | 12/2015 | Patel | H04L 63/102 713/182 |
| 2016/0380850 A1 | 12/2016 | Duncan et al. | |
| 2018/0308302 A1* | 10/2018 | Al-Yousef | H04L 63/10 |
| 2021/0112043 A1* | 4/2021 | Duncan | H04L 9/083 |

* cited by examiner

*Primary Examiner* — Michael R Vaughan
(74) *Attorney, Agent, or Firm* — Isidore PLLC

(57) ABSTRACT

A security system autonomously secures a modular data center (MDC) from a detected external threat by disabling access to physical communication ports. Sensor(s) are monitored that detects a presence of a person in an exterior or interior of a volumetric container of an MDC. Information technology (IT) component(s) are positioned within the volumetric container and include physical communication port(s) that receive a hot pluggable device containing memory. In response to determining that a detected person is not authenticated, a controller identifies any hot pluggable device that is currently engaged to a physical communication port of the MDC. The controller selectively disables access via the physical communication port(s) that is not engaged to a hot pluggable device. The controller enables continued access to the IT component(s) by any identified hot pluggable device that was engaged to a physical communication port before detecting the presence of the unauthenticated person.

20 Claims, 9 Drawing Sheets

EDGE DATA CENTER SECURITY SYSTEM THAT AUTONOMOUSLY DISABLES PHYSICAL COMMUNICATION PORTS ON DETECTION OF POTENTIAL SECURITY THREAT

BACKGROUND

1. Technical Field

The present disclosure relates in general to a security system of a modular data center (MDC), and more particularly to a security system that secures information technology (IT) components of an MDC.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A data center houses IHSs and associated components, such as telecommunications and storage systems. A modular data center (MDC) is a deployable data center. An MDC can be placed anywhere data capacity is needed. MDC systems consist of purpose-engineered modules and components that offer scalable data center capacity with multiple power and cooling options. Modular edge data centers (MEDCs) are generally smaller MDC facilities that extend the edge of the network to deliver cloud computing resources and cached streaming content to local end users. MEDCs that have only one or two racks for IT are also referred to as micro MDCs. Many MEDCs are deployed as a single volumetric container that is installed in a remote location, such as north of the Arctic Circle. At these remote locations, a malicious intruder to the MEDC, even if detected, would have time to gain physical access to IHSs within the MEDC before any human intervention response could occur. More than the potential loss of the value of hardware, the intrusion jeopardizes time sensitive workloads handled by the compromised MEDC, compromises other IHSs that are network-connected to the compromised MEDC, and places sensitive enterprise data contained in the MEDC at risk.

BRIEF SUMMARY

In accordance with the teachings of the present disclosure, a modular data center (MDC) includes a volumetric container having an interior enclosure. At least one information technology (IT) component is positioned within the volumetric container and includes one or more physical communication ports. Each physical communication port is configured to receive a hot pluggable device containing memory that is addressable by the at least one IT component. A security system of the MDC includes one or more sensors that detect a presence of a person in at least one of: (i) proximity to an exterior of the volumetric container; and (ii) an interior of the volumetric container. The security system includes a personnel authentication device that receives authentication credentials to verify authorized personnel. The security system includes a controller that is communicatively coupled to the at least one IT component, the one or more sensors, and the personnel authentication device. The controller executes a security platform application that enables the MDC to determine, based on the one or more sensors, whether the presence of a person is detected. In response to determining that the presence of a person is detected, the controller determines, based on data received from the personnel authentication device, whether the detected person is authenticated. In response to determining that the detected person is not authenticated, the controller identifies any hot pluggable device containing memory that is accessible by the at least one IT component and that is currently engaged to one of the one or more physical communication ports. The controller selectively disables access via the one or more physical communication ports to which no hot pluggable device is engaged at the time of detecting the presence of the unauthenticated person. The controller enables continued access to the at least one IT component by any identified hot pluggable device that was engaged before detecting the presence of the unauthenticated person.

In accordance with the teachings of the present disclosure, an MDC security system includes one or more sensors that detects a presence of a person in at least one of: (i) proximity to an exterior of a volumetric container of an MDC; and (ii) an interior enclosure of the volumetric container. The MDC includes at least one IT component positioned within the volumetric container and has one or more physical communication ports. Each physical communication port is configured to receive a hot pluggable device containing memory that is addressable by the at least one IT component. The MDC security system includes a personnel authentication device that receives authentication credentials to verify authorized personnel. A controller of the MDC security system is communicatively coupled to the at least one IT component, the one or more sensors, and the personnel authentication device. The controller executes a security platform application that enables the MDC to determine, based on the one or more sensors, whether the presence of a person is detected. In response to determining that the presence of a person is detected, the controller determines, based on data received from the personnel authentication device, whether the detected person is authenticated. In response to determining that the detected person is not authenticated, the controller identifies any hot pluggable device containing memory that is addressable by the at least one IT component and that is currently engaged to one of the one or more physical communication ports. The controller selectively disables access via the one or more physical communication ports to which no hot pluggable device was engaged at the time of detecting the presence of the unauthenticated person. The controller enables continued access to the at least one IT component by any identified hot pluggable device that was engaged before detecting the presence of the unauthenticated person.

In accordance with the teachings of the present disclosure, a method is disclosed for autonomously securing an MDC from an external malicious actor. The method includes monitoring one or more sensors that detects a presence of a person in at least one of: (i) proximity to an exterior of a volumetric container of an MDC; and (ii) an interior enclosure of the volumetric container. The MDC includes at least one IT component positioned within the volumetric container and includes one or more physical communication ports. Each physical communication port is configured to receive a hot pluggable device containing memory that is addressable by the at least one IT component. The method includes determining, based on the one or more sensors, whether the presence of a person is detected. In response to determining that the presence of a person is detected, the method includes determining, based on data received from the personnel authentication device, whether the detected person is authenticated. In response to determining that the detected person is not authenticated, the method includes identifying any hot pluggable device containing memory that is addressable by the at least one IT component and that is currently engaged to one of the one or more physical communication ports. The method includes enabling continued access to the at least one IT component by any identified hot pluggable device that was engaged before detecting the presence of the unauthenticated person. If not detached, the already engaged hot pluggable device can continue to operate. Otherwise, the method includes selectively disabling access to the remaining one or more physical communication ports. The remaining one or more physical communication ports are the ports that were not engaged to a hot pluggable device at the time of detecting the presence of the unauthenticated person.

The above presents a general summary of several aspects of the disclosure to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
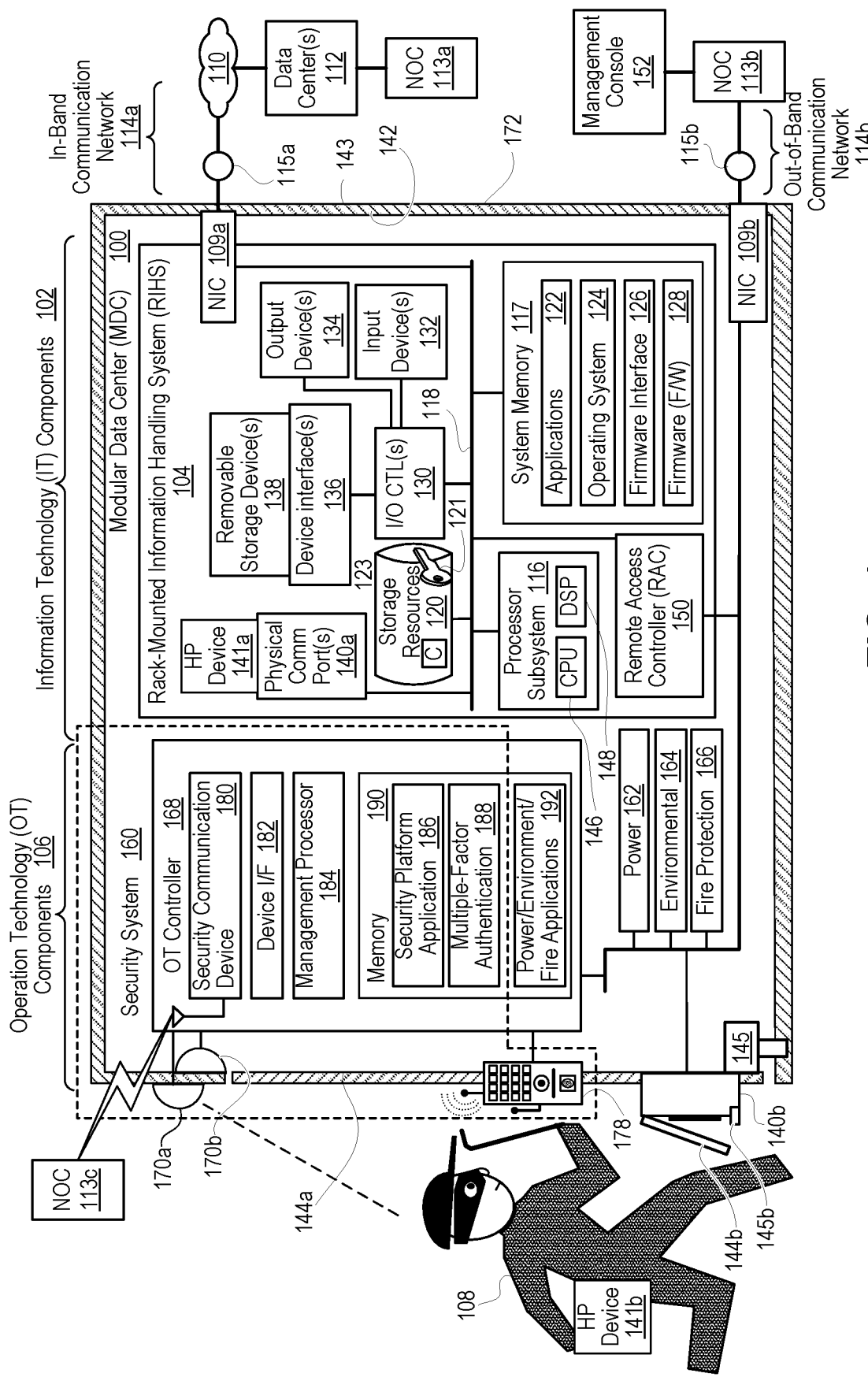
FIG. 1 is a block diagram of a modular data center (MDC) that autonomously secures the MDC from a detected un-authorized and/or un-authenticated person, according to one or more embodiments.

According to aspects of the present disclosure, a security system, a modular data center (MDC), and a method are provided that autonomously secures an MDC from an un-authorized access by autonomously disabling access to physical communication ports on detection of a potential security threat or threat event. Sensor(s) monitor for and detect a presence of a person in an exterior or interior of a volumetric container of an MDC. Information technology (IT) component(s) are positioned within an interior enclosure of the volumetric container of the MDC and include physical communication port(s) that receive a hot pluggable device containing memory. In response to determining that a detected person is not authenticated, a controller identifies any hot pluggable device that is currently engaged to a physical communication port of the MDC. The controller selectively disables access via the physical communication port(s) that is/are not engaged to a hot pluggable device. The controller enables continued access to the IT component(s) by any identified hot pluggable device that was engaged to a physical communication port before detecting the presence of the un-authenticated person.

The security system determines whether a person is not authenticated ("un-authenticated") and thus poses a potential threat. As used herein, un-authenticated encompasses at least several scenarios for finding that a person should not be at the MDC. First, the person refuses to present, or is incapable of presenting physical authentication credentials. Second, authentication credentials are presented, such as an access card or biometric data that identifies the person, but identity is not cleared to enter the MDC and thus lacks authority (un-authorized). For example, to avoid disruptions of the MDC, personnel have to be individually authorized or arrive within a predefined schedule in order to be deemed authorized.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 is a simplified functional block diagram of modular data center (MDC) 100 having IT components 102 such as rack information handling systems (RIHSs) 104 that receive infrastructure support by operation technology (OT) components 106, including security from external threats such as unauthorized, unauthenticated person 108. Within the general context of IHSs, RIHS 104 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, RIHS 104 may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. RIHS 104 may also include one or more buses operable to transmit communications between the various hardware components. In one or more embodiments, RIHS 104 is rack-mounted to provide computing, communication and storage functionality in MDC 100.

RIHS 104 includes a network interface, depicted as network interface controller (NIC) 109a, in communication via network 110 for communicating with data center(s) 112. Management of data center(s) 112 is provided by network operations center (NOC) 113a. NIC 109a enables RIHS 104 and/or components within RIHS 104 to communicate and/or interface with other devices, services, and components that are located external to RIHS 104. These devices, services, and components can interface with RIHS 104 via an external network, such as network 110, using one or more communication protocols that include transport control protocol (TCP/IP) and network block device (NBD) protocol. Network 110 can be a local area network, wide area network, personal area network, and the like, and the connection to and/or between network 110 and RIHS 104 can be wired, wireless, or a combination thereof. For purposes of discussion, network 110 is indicated as a single collective component for simplicity. However, it should be appreciated that network 110 can comprise one or more direct connections to other devices as well as a more complex set of interconnections as can exist within a local area network or a wide area network, such as the Internet. In one or more embodiments, NIC 109a supports in-band communication network 114a via connection 115a that transfers workload and computer data between IT components 102 and data center(s) 112. In one or more embodiments, data center(s) 112 is cloud based.

Processor subsystem 116 is coupled to system memory 117 via system interconnect 118. System interconnect 118 can be interchangeably referred to as a system bus, in one or more embodiments. System interconnect 118 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 118 can also be a Double Data Rate (DDR) memory interface. The system memory 117 can either be contained on separate, removable dual inline memory module (RDIMM) devices or system memory 117 can be contained within persistent memory devices (NVDIMMs). For example, the NVDIMM-N variety of NVDIMMs contain both random access memory, which can serve as system memory 117, and non-volatile memory. It should be noted that other channels of communication can be contained within system interconnect 118, including but not limited to i2c or system management bus (SMBus). System interconnect 118 communicatively couples various system components. Examples of system components include replaceable local storage resources 120, such as solid-state drives (SDDs) and hard disk drives (HDDs).

In a particular one or more embodiments, local storage resources 120 can include or comprise self-encrypting drives (SEDs) that protecting data from unauthorized access. SEDs use two sets of keys to protect the data from unauthorized access. One key is called the media encryption key (MEK). In the drive factory, each SED randomly generates an MEK that is encrypted and embedded within the drive. The MEK is never exposed outside the drive and requires no management by the user. The MEK functions as a secret password so that the encryption/decryption engine built into the drive will know how to decrypt the user data stored on the physical media. The encryption in the drive uses a symmetric key algorithm which means the MEK is the same for encrypting and decrypting the data on the disk. This MEK can be changed by cryptographic erase (CE), but the encryption can never be turned off. CE is a feature that permanently changes the MEK so the drive can be reused or repurposed. After the CE is performed, the data previously written to the drive becomes unreadable. CE is also known as secure erase or crypto-erase. The second required key is called the authority credential (AC), sometimes referred to as the locking key, credentials, authentication keys, or access key (AK). It is used to unlock and configure the SED. There is one AC for each SED. For example, DELL storage controller (SC) Series arrays automatically detect SED drives and will create the ACs when the array is initially configured with SEDs or when SEDs are added to a legacy system. The AC is stored in a KMIP secret data object on the KMS. There is one valid secret data object for each SED that has been put into a lockable state. An SC Series array completes a Key Management Interoperability Protocol (KMIP) register on this secret data object, and the secret data object "keyblock" contains the AC. The SC array also controls the contents of the secret data object.

Once an SED has been configured with an AC, the AC must be provided to unlock the drive, and the drive remains unlocked only while the device is powered on. The drive locks itself upon losing power or shutting down, and the AC must be provided again before the drive will unlock and participate in input/output (I/O) operations. The process of how data is accessed on an SED during normal operation includes: (i) Upon boot, storage controller operating system (SCOS) sends a series of commands to the drive to unlock the drive. One of those commands is an authentication request which carries the AC. (ii) The drive electronics hash the AC from the storage controller and pull the stored hashed access key from the drive storage. The hashed keys are compared. (iii) If the hashed keys do not match, no access is given to the data and a security error is passed back to the storage controller stating that the drive is locked and that the subsystem does not have authorization to access it. If the hashed keys match, a subsequent drive command is sent to unlock the drive. (iv) During a request for data, the encrypting/decrypting circuit pulls the requested data from the drive and uses the MEK to decrypt the encrypted user data. The decrypted user data is then passed back to the storage controller. The drive remains unlocked until the drive gets powered down. If removed, the drive becomes a locked drive in which security has been enabled and the drive has been unexpectedly removed from the storage array, or powered down. Data on the drive cannot be read from or written to until the appropriate AC is provided. Thus, contents 123 of storage resources 120 can be selectively protected by locking keys 121 issued to storage resources 120 to make content 123 externally available without encryption. Deleting locking keys 121 does not preclude continued operation within MDC 100 but does protect the content 123 from exploitation if a particular storage resource 120 is removed from MDC 100.

Software and/or firmware modules and one or more sets of data can be stored on local storage resources 120 and be utilized during operations of RIHS 104. Specifically, in one embodiment, system memory 117 can include therein a plurality of such modules, including one or more of application(s) 122, operating system (OS) 124, a firmware interface 126 such as basic input/output system (BIOS) or Uniform Extensible Firmware Interface (UEFI), and platform firmware (FW) 128. These software and/or firmware modules have varying functionality when their corresponding program code is executed by processor subsystem 116 or secondary processing devices within RIHS 104. For example, application(s) 122 may include a word processing application, a presentation application, and a management station application, among other applications.

RIHS 104 further includes one or more input/output (I/O) controllers 130 that support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with RIHS 104. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses. Physical communication port(s) 140a that are communicatively coupled to system interlink 118 enable coupling RIHS 104 with other devices. For example, external physical communication port 140b can be used to gain access to RIHS 104 without having to work inside of the close confines of interior enclosure 142 of volumetric container 143 of MDC 100. One or more doors 144a, physically secured by door lock(s) 145, enable physical access to IT components 102 and OT components 106. In one or more embodiments, door lock(s) 145a include door open and/or door closed sensing. Hot pluggable (HP) device 141a is engaged to physical communication port 140a. HP device 141b is not yet engaged to either physical communication port 140a or external physical communication port 140b. External physical communication port 140b is accessible via small door 144b that is physically secured by small door lock 145b. In one or embodiments, door 144 and/or door lock 145b include one or more sensors that detect door open and/or door closed positions. In one or more embodiments, hot pluggable devices 141a, 141b are a selected one of: (i) a storage device containing at least one of: (a) computer program code; (b) computer data; and (c) digital media; and (ii) an encryption key device.

Processor subsystem 116 can include at least one central processing unit (CPU) 146 that is augmented by digital signal processor (DSP) 148. Processor subsystem 116 interfaces to functional components of the RIHS 104 such as a baseboard management controller (BMC). Remote access controller (RAC) 150 performs BMC functionality including monitoring the physical state of a computer, network server, or other hardware devices of IT components 102 using sensors. RAC 150 also supports communicating with a system administrator through an independent connection, such as NIC 109b. As a non-limiting example, RAC 150 can be an improved integrated Dell Remote Access Controller (iDRAC) from Dell® that supports in part security operation functionality described herein. The iDRAC has the ability to edit/create files locally to itself. The iDRAC also has the ability to see OS specific files. RAC 150 performs out-of-band communication for the RIHS 104 via NIC 109b. In one or more embodiments, NIC 109a supports out-of-band communication network 114b via connection 115b to administrative or management console 152 at NOC 113b.

To manage operations of MDC 100, management console 152 transfers administrative data, administrative settings and upgraded computer code via out-of-band communication network 114b. In one or more embodiments, OT components 106, under control of OT controller 168, provide infrastructure operational support to IT components 102 of MDC 100 including security system 160, power system 162, environmental system 164, and fire protection system 166.

Security system 160, in general, protects MDC 100, and in particular, protects valuable enterprise workloads and data, from exterior threats such as by unauthorized or unauthenticated person 108. One or more sensors 170a, 170b of security system 160 detects a presence of a person in at least one of: (i) proximity to exterior 172 of volumetric container 143; and (ii) interior enclosure 142 of volumetric container 143. Sensor 170a generally represents sensors located external to volumetric container 143, while sensor 170b generally represents sensors located internal to volumetric container 143. Sensors 170a, 170b can be any one or more of a host of sensors including one or more of: (i) infrared sensor; (ii) optical sensor; (iii) range finding sensor; (iv) acoustic sensor; (v) pressure sensor; (vi) light curtain sensor; (vii) motion sensor; and (viii) door sensor. Sensors 170a, 170b can be any one or more of a host of sensors provide functions including one or more of (i) infrared imaging; (ii) optical imaging; (iii) range finding; (iv) acoustic sensing; (v) pressure sensing; (vi) light curtain sensing; (vii) motion sensing; and (viii) door sensing. Personnel authentication device 178 of security system 160 receives authentication credentials to verify authorized personnel. One or more sensors 170a, 170b of security system 160 detects a presence of a person in at least one of: (i) proximity to exterior 172 of volumetric container 143; and (ii) interior enclosure 142 of volumetric container 143. Sensor 170a generally represents sensors located external to volumetric container 176, while sensor 170b generally represents sensors located internal to volumetric container 176. Sensors 170a, 170b can be any one or more of a host of sensors that can provide functions including one or more of (i) infrared imaging; (ii) optical imaging; (iii) range finding; (iv) acoustic sensing; (v) pressure sensing; (vi) light curtain sensing; (vii) motion sensing; and (viii) door sensing. Personnel authentication device 178 can support one or more authentication capabilities including: (i) biometric voice recognition; (ii) biometric facial recognition; (iii) biometric fingerprint recognition; (iv) biometric retina recognition; (v) manual, gesture or oral passcode verification; (vi) access card reading; and (vii) radio frequency identification (RFID) badge interrogation.

In one or more embodiments, OT controller 168 serves, at least in part, as controller for security system 160. OT controller 168 is an information handling system that can include some or all of the functional components of RIHS 104. In addition, OT controller 168 can include specialized capabilities including functions of security communication device 180, which provides dormant, undiscoverable communication channel to separate NOC 113c. In one or more embodiments, security communication device 180 is a wireless wide area network (WWAN) communication device, such as a cellular telephone that is configured to ignore incoming call/session requests to make less discoverable by third parties that intend to cut off MDC 100 from notifying help. OT controller 168 is communicatively coupled to sensors 170a, 170b and personnel authentication device 178 via device interface (I/F) 182.

OT controller 168 has management processor 184 that executes security platform application 186 and multiple-factor authentication application 188 contained in memory 190. Multi-factor authentication is an authentication method in which a computer user or automated entity is granted access only after successfully presenting two or more pieces of evidence to an authentication mechanism. The two or more pieces of evidence can be based on knowledge, possession, or inherence. Memory 190 also includes power, environmental, and fire protection applications 192. OT controller 168 is communicatively coupled, either directly or indirectly, via in-band communication network 114a and out-of-band communication network 114b to secure IT components 102.

In one or more embodiments, security platform application 186 is configured to communicate with at least one of NOCs 113a-c following detection of an un-authorized/un-authenticated person. The at least one of NOCs 113a-c can notify support personnel to travel to MDC 100. Human or automated response systems at the at least one of NOCs 113a-c can analyze sensor data as a required first step before MDC 100 is instructed to implement or cancel an action to secure IT components 102. Human or automated response systems at the at least one of NOCs 113a-c can analyze senor data as a follow-on step after MDC 100 implements an action to secure IT components 102.

Figure 2:
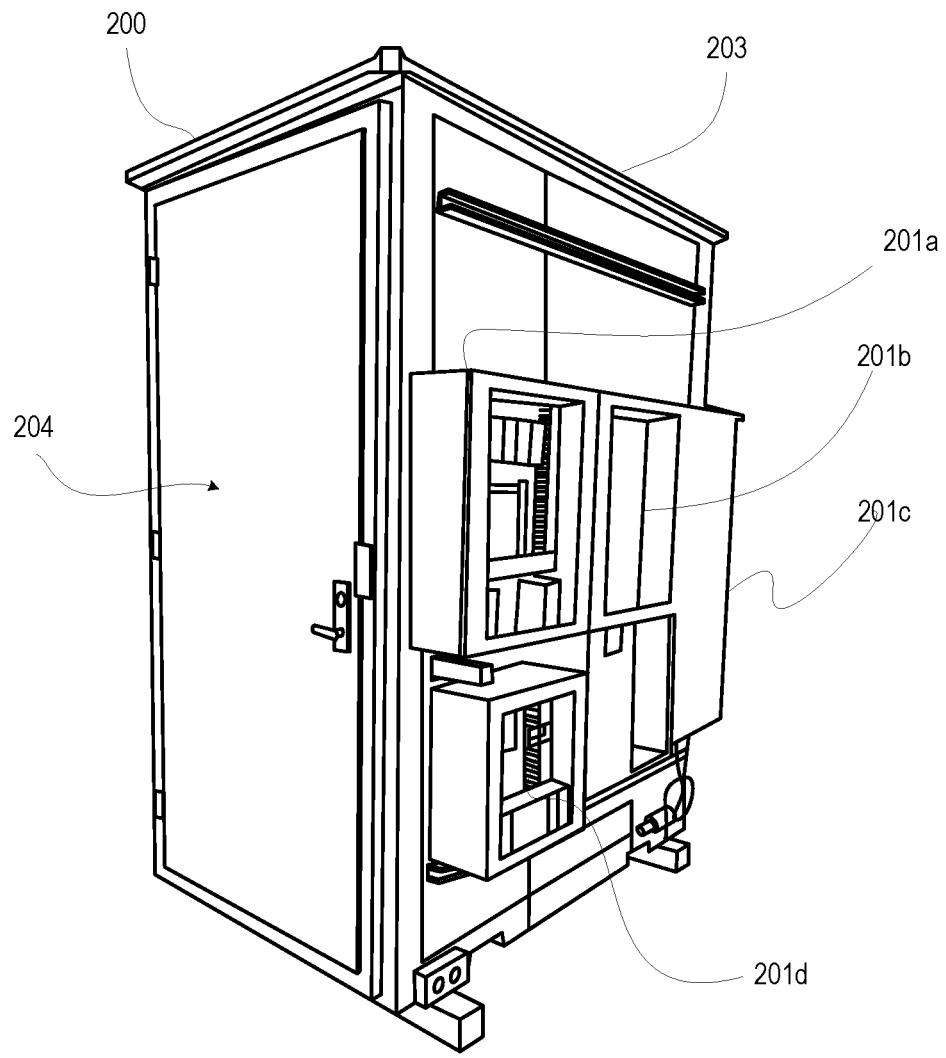
FIG. 2 is a side perspective view of an example MDC, according to one or more embodiments.
Figure 3:
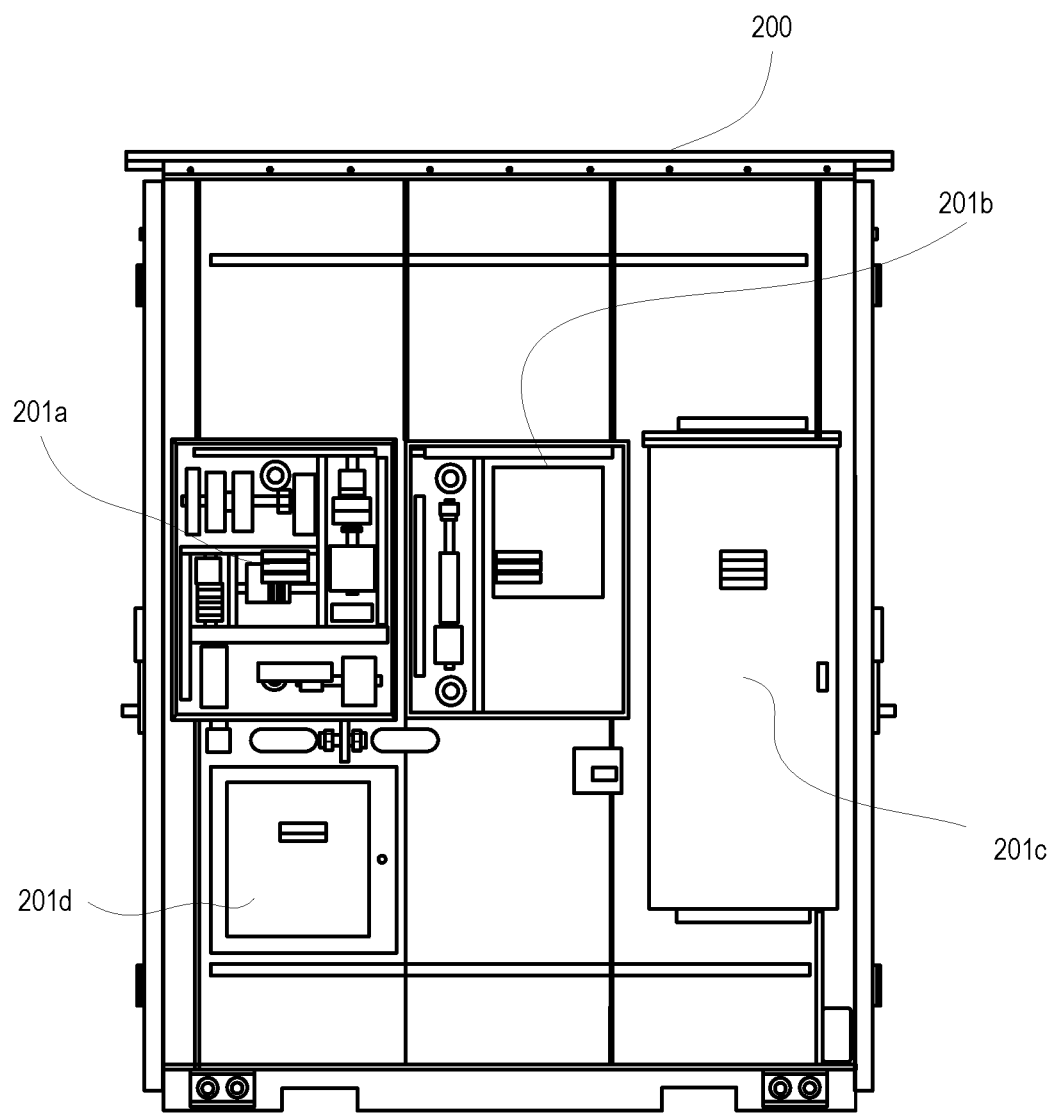
FIG. 3 is a front view of the example MDC, according to one or more embodiments.
Figure 4:
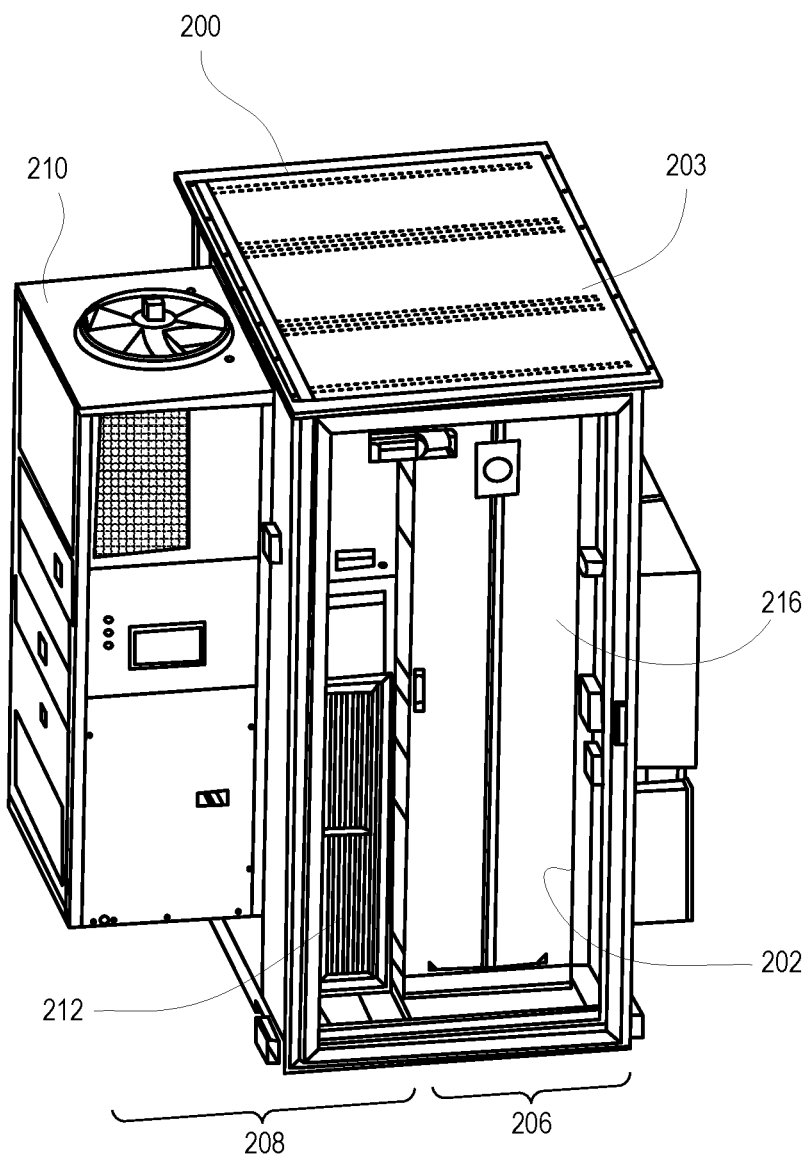
FIG. 4 is a top perspective view of the example MDC equipped with information technology (IT) and operation technology (OT) components, according to one or more embodiments.

FIG. 2 depicts a side perspective view of an example micro-MDC 200 that is palletized for delivery. Micro-MDC 200 can contain at least some of the same or similar functional components described for MDC 100 (FIG. 1). External enclosures 201a-d provide access respectively to controls, security, power, and network. Access to interior enclosure 202 (FIG. 4) of volumetric container 203 is through door 204. FIG. 3 depicts a front view of the example micro-MDC 200. FIG. 4 depicts a top perspective view of example micro-MDC 200 with door 204 (FIG. 2) removed to expose IT components 206 and OT components 208. OT components 208 include air handling unit 210 that is externally mounted to enclosure 202. Air redirection structure 212 within interior enclosure 202 of volumetric container 203 directs cooling air through RIHS 216 of IT components 206. In one or more embodiments, MDC 200 is configured as micro MDC with one or two RIHS 216 for use as a modular edge data center (MEDC).

Figure 5:
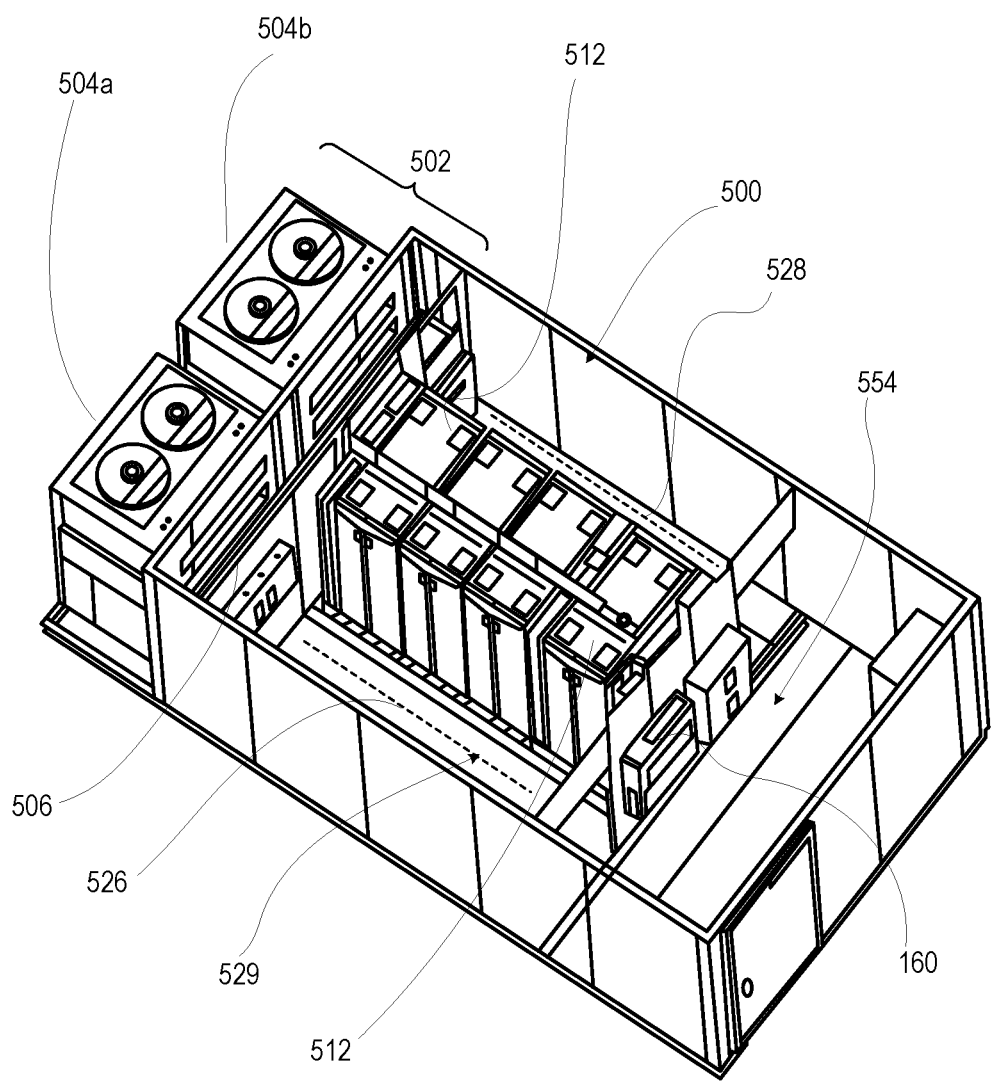
FIG. 5 is a top view of an example MDC having an IT compartment with a plurality of IT racks housing IT components that are protected from unauthorized access based on detection of a loss of connectivity with an external data center, according to one or more embodiments.

FIG. 5 depicts a three-dimensional, top view of example MEDC 500 that has IT compartment 529 and utility room 554. IT compartment 529 includes a longitudinal row of IT components 512 between cold and hot aisles 526, 528. Dual-AHU air handling system 502 of MEDC 500 includes two forward-mounted or aft-mounted AHUs 504a, 504b. AHUs 504a, 504b exchange cooling air via air redirection structure 506 with the IT compartment 529 and utility room 554 via cold and hot aisles 526, 528. Utility room 554 includes security system 160 MEDC 500 is an example larger MDC. It is appreciated that aspects of the present disclosure can be applied to larger MDCs and MDCs that include multiple volumetric enclosures.

Figure 6:
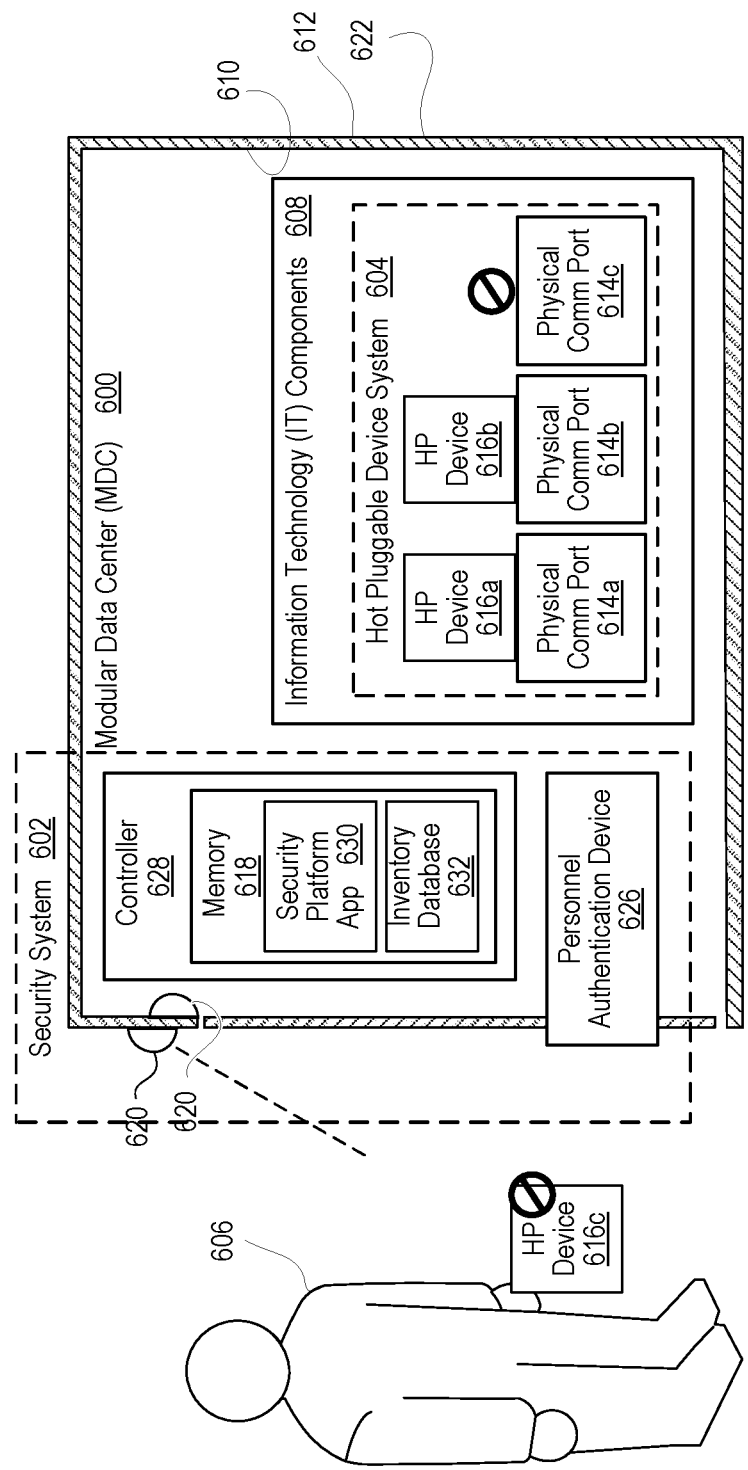
FIG. 6 is a simplified functional diagram of a security system of the MDC that enables securing of a hot pluggable device interface system (or port) of the MDC, according to one or more embodiments.

FIG. 6 depicts a simplified functional diagram of MDC 600 having security system 602 that secures hot pluggable (HP) device system 604 in response to a detected presence of a person, who could present an external physical threat to data and operations of MDC 600, such as when detected person 606 is unauthorized. MDC 600 can be an implementation of MDC 100 (FIG. 1). Similarly named components are assumed to be the same as those presented in FIG. 1, and that use of different reference numerals are intended to simplify the description of the components relative to this isolated view. In the illustrated embodiment, IT component(s) 608, which includes HP device system 604, is positioned within interior enclosure 610 of volumetric container 612 of MDC 600. One or more physical communication ports 614a-c of HP device system 604 are each configured to receive respective HP devices 616a-c containing memory 618 that is accessible and/or addressable by at least one IT component 608. Security system 602 includes sensor(s) 620 that detects a presence of a person 606 in at least one of: (i) proximity to exterior 622 of volumetric container 612 and (ii) interior enclosure 610 of volumetric container 612. Security system 602 includes personnel authentication device 626 that receives authentication credentials to verify authorized personnel. Controller 628 is communicatively coupled to at least one IT component 608, sensor(s) 620, and personnel authentication device 626. Controller 628 executes security platform application 630 that enables MDC 600 to secure the at least one IT component 608. In particular, controller 628 determines, based on sensor(s) 620, whether the presence of a person 606 is detected. In response to determining that the presence of a person 606 is detected, controller 624 determines, based on data received from personnel authentication device 626, whether the detected person 606 is authenticated. In response to determining that the detected person 606 is not authenticated (within a preset time period for entry or receipt of the required authentication), controller 628 identifies any HP device 616*a-c* that is currently engaged to one of the one or more physical communication ports 614*a-c*. In the example provided by FIG. 6A, HP devices 616*a-b* are engaged respectively to physical communication ports 614*a-b*. HP device 616*c* is not yet engaged to any physical communication ports 614*a-c*. Controller 628 enables continued access to at least one IT component 608 by any identified HP device 616*a-b* that was engaged before detecting the presence of the unauthenticated person 606. Controller 628 selectively disables access via the one or more physical communication ports 614*a-c* to which an unidentified HP device 616*c* can be (or is) physically or communicatively engaged following the detection of the presence of the unauthenticated person 606. In one or more embodiments, security platform application 630 maintains inventory database 632 to track during start-up and periodically during run-time operation the identifiers for tracking previously identified HP device 616*a-b*. Hot plugging and unplugging events can trigger updates to inventory database 632. According to one or more embodiment, by referencing inventory database 632, controller 628 can detect an unidentified HP device 616*c* if the unidentified HP device 616*c* replaced one of currently engaged HP devices 616*a-b*. In addition, by referencing inventory database 632, controller 628 detects an unidentified HP device 616*c* if inserted in empty physical communication ports 614. In addition, by referencing inventory database 632, the controller 628 detects that previously engaged HP devices 616*a-b* has become untrustworthy if removed and subsequently reinserted. The previously identified HP device 616*a-b* become untrustworthy as these devices could have been modified during the interim.

Figure 7A:
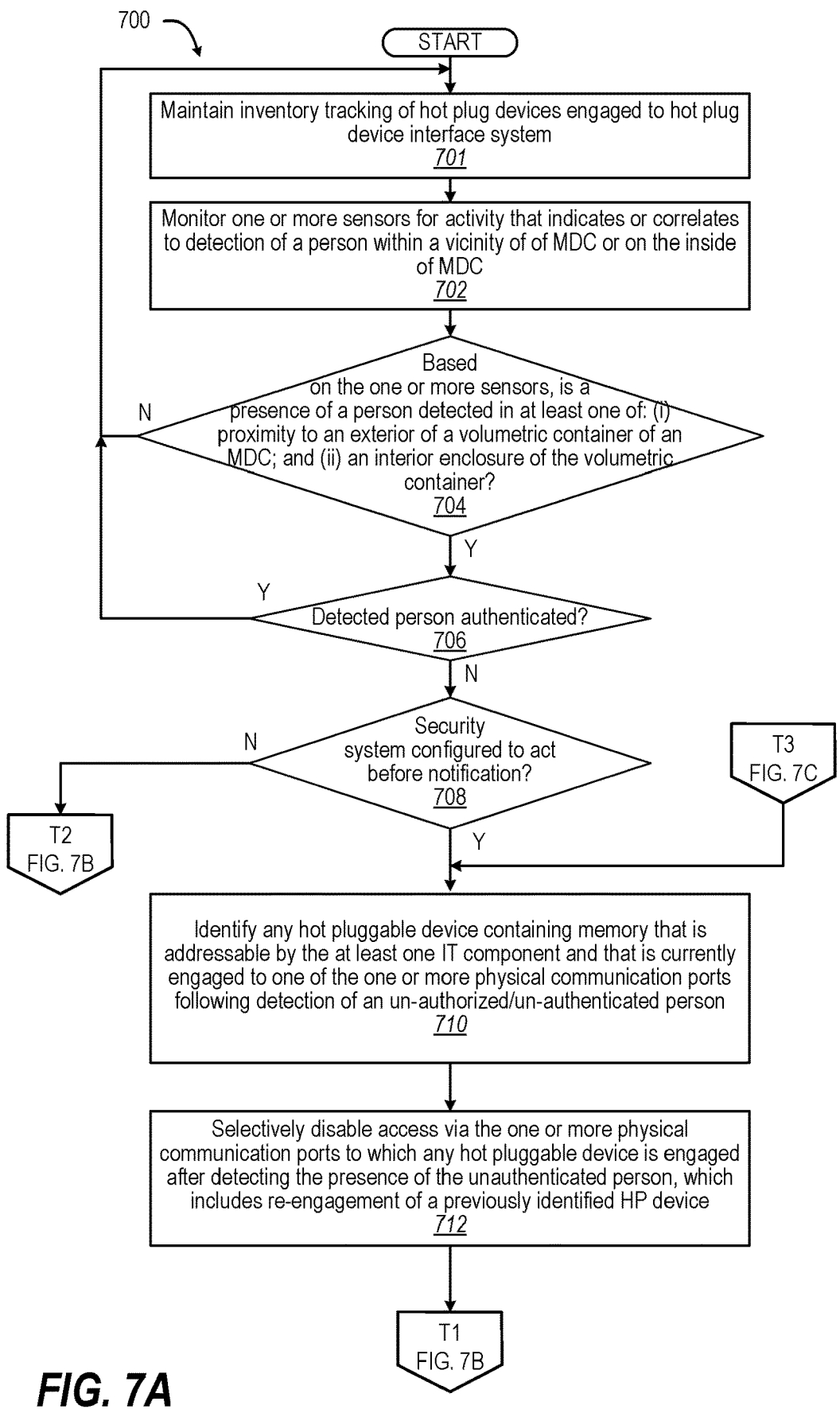
FIGS. 7A-C present flow diagrams of a method for securing access to the hot pluggable device interface system and continuing operation of the MDC, following detection of an un-authorized/un-authenticated person, according to one or more embodiments.
Figure 7B:
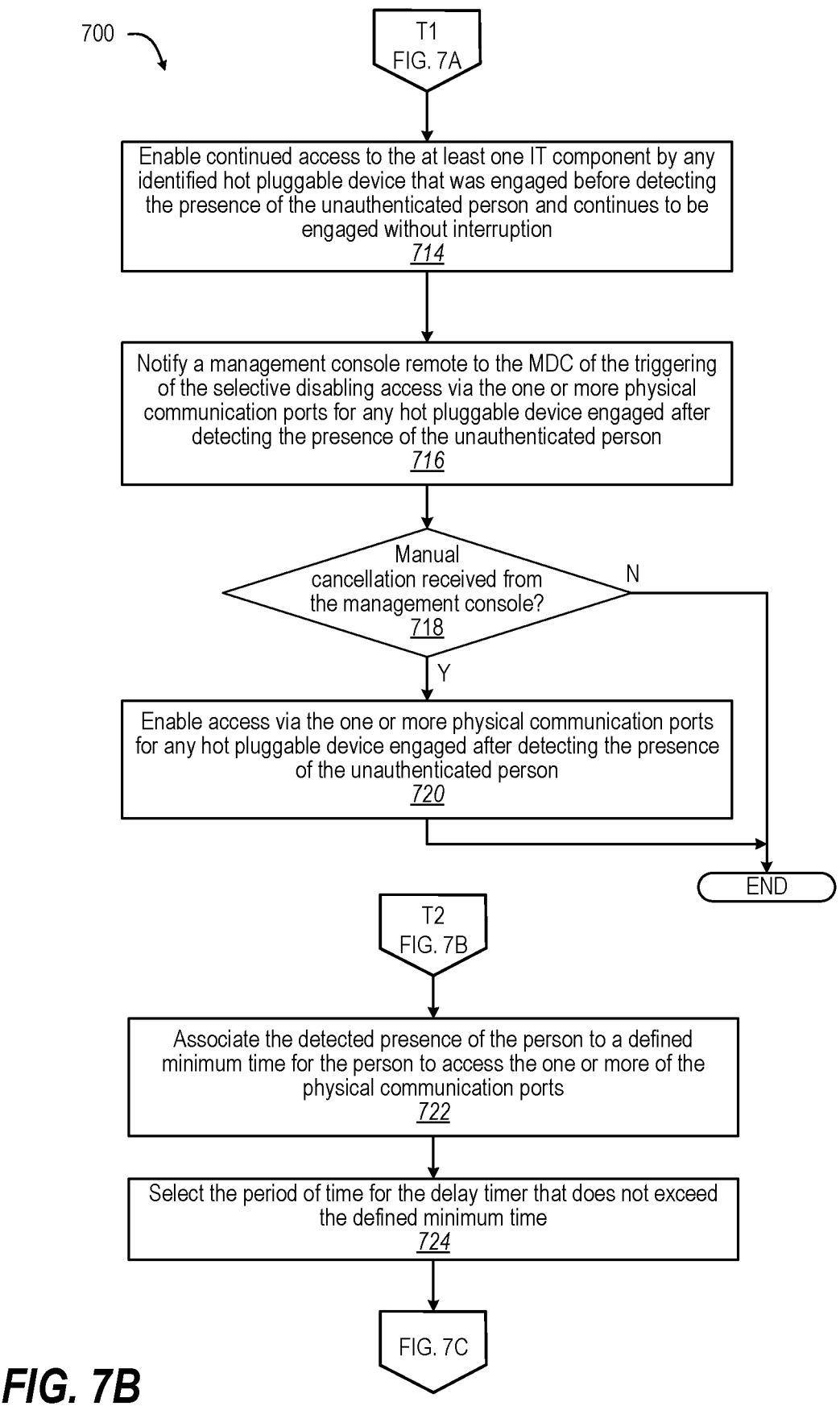
Figure 7C:
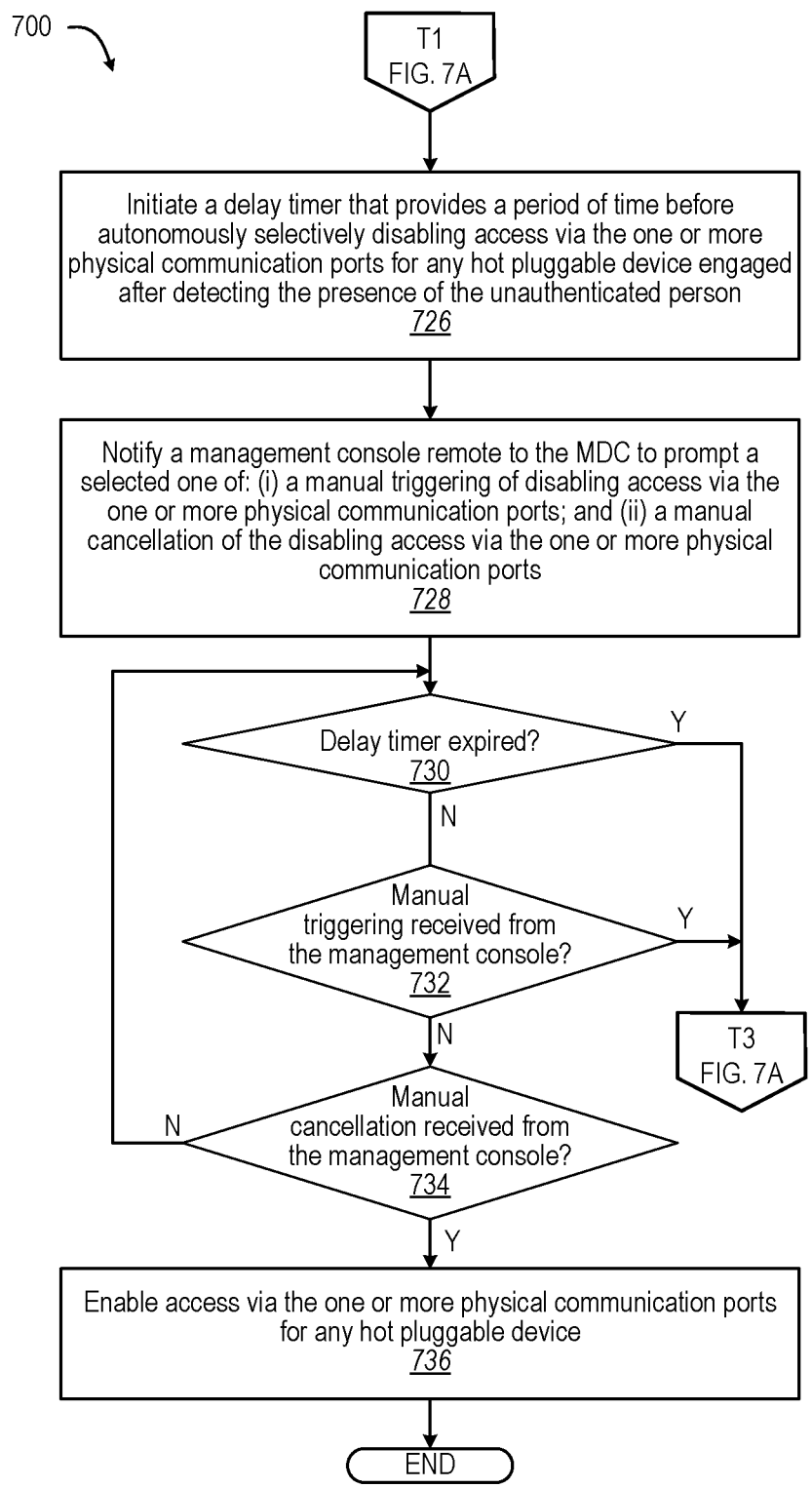

FIGS. 7A-C present a flow diagram of method 700 for securing access to hot pluggable device interface system (or port) while continuing operation of an MDC, following detection of an un-authorized/un-authenticated person. OT controller 168 (FIG. 1) or controller 628 (FIG. 6) respectively enable MDC 100 (FIG. 1) and MDC 600 (FIG. 6) to perform method 700. With initial reference to FIG. 7A, method includes maintaining inventory tracking of hot plug devices engaged to hot plug device interface system (block 701). Method 700 includes monitoring one or more sensors for activity that indicates or correlates to detection of a person within a vicinity of (e.g., within an outside perimeter) of MDC or on the inside of MDC (block 702). In one or more embodiments, the one or more sensors include one or more of: (i) acoustic sensors; (ii) motion sensors; (iii) pressure sensors; (iv) door sensors; (v) infrared sensor; and (vi) image sensors. Controller determines in decision block 704, based on the received data from one or more sensors, whether a presence of a person is detected in at least one of: (i) proximity to an exterior of a volumetric container of an MDC; and (ii) an interior enclosure of the volumetric container. As presented above, the MDC includes at least one IT component positioned within the volumetric container, and the MDC includes one or more physical communication ports. Each physical communication port is configured to receive a hot pluggable device containing memory that is addressable by the at least one IT component. In one or more embodiments, the hot pluggable device is a selected one of: (i) a storage device containing at least one of: (a) computer program code; (b) computer data; and (c) digital media; and (ii) an encryption key device.

In response to determining that the presence of a person is not detected, method 700 returns to block 701. In response to determining that the presence of a person is detected, controller determines in decision block 706, based on data received from a personnel authentication device, whether the detected person is authenticated. In response to determining that the detected person is authenticated, method 700 returns to block 701. Depending on the types of sensing and authentication, additional criteria can be required before a detected person is determined to be unauthenticated. For example, a person could be sensed external to MDC at a distance that is both not an imminent threat and is outside of the range of the personnel authentication device. Thus, a distance criterion could be required to allow for an authentication process to occur. For another example, an authentication process could require a certain amount of time to elapse, such as the time required to present a control card or enter a control code. Thus, a time interval criterion could be required to allow for an authentication process to occur. Conversely, sensing an intrusion inside the interior enclosure prior to authentication can trigger an immediate response.

In one or more embodiments, detection and authentication can apply generally to the entire MDC 600 (FIG. 6). In one or more embodiments, detection and authentication can apply specifically to a hot pluggable device interface system with other portions of MDC 600 (FIG. 6) handled with different security configurations. For example, a hot pluggable device interface system can be accessible without entering the MDC. For another example, a hot pluggable device interface system can be accessible through one door of the MDC but not another.

In response to determining that the detected person is not authenticated, a determination is made, in decision block 708, whether the security system is configured to act before notification of NOC (113*a-c* of FIG. 1). In one or more embodiments, security system 502 (FIG. 5) is configured to communicate with at least one NOC following detection of an un-authorized/un-authenticated person. The NOC can notify support personnel to travel to MDC 100 (FIG. 1). Human or automated response systems at the NOC can be part of the decision process to implement securing IT components or can provide an override capability after implementation. In response to determining that the security system is configured to act before notification, method 700 includes identifying any hot pluggable device containing memory that is addressable by the at least one IT component and that is currently engaged to one of the one or more physical communication ports following detection of an un-authorized/un-authenticated person (block 710). Detection is sufficiently sensitive to preclude any access to the hot pluggable device interface system before a response is taken. Method 700 includes selectively disabling system access via the one or more physical communication ports to which no hot pluggable device is engaged before or at the time of detecting the presence of the unauthenticated person (block 712). The disabling of the ports include disabling ports at which removal and re-engagement of a previously identified HP device is detected Continuing with reference to FIG. 7B, method 700 includes enabling continued access to the at least one IT component by any identified hot pluggable device that was engaged before detecting the presence of the unauthenticated person and continues to be engaged without interruption (block 714). Method 700 includes notifying a management console remote to the MDC of the triggering of the selective disabling access after detecting the presence of the unauthenticated person (block 716). Controller determines, in decision block 718, whether a manual cancellation of the disabling is received from the management console. In response to not receiving a manual cancellation from the management console, method 700 ends. In response to receiving a manual cancellation from the management console, method 700 includes enabling access via the one or more physical communication ports to any hot pluggable device engaged after detecting the presence of the unauthenticated person (block 720). Then method 700 ends.

In response to determining that the security system is not configured to act before notification of NOC in decision block 708 (FIG. 7A), method 700 includes associating the detected presence of the person to a defined minimum time for the person to access the one or more of the physical communication ports (block 722). For example, the minimum time can depend on the distance sensitivity of the sensor and any physical security barriers between the person and the one or more of the physical communication ports. Thus, the minimum time provides a window of time for the security system to respond following detection of an un-authorized/un-authenticated person but before the hot pluggable device interface system is compromised. Method 700 includes selecting a period of time for the delay timer that does not exceed the defined minimum time (block 724). Continuing with reference to FIG. 7C, method 700 includes initiating a delay timer that provides a period of time before autonomously disabling access via the one or more physical communication ports for any hot pluggable device engaged after detecting the presence of the unauthenticated person (block 726). Method 700 includes notifying a management console remote to the MDC to prompt a selected one of: (i) a manual triggering of disabling access via the one or more physical communication ports; and (ii) a manual cancellation of the disabling access via the one or more physical communication ports (block 728). A determination is made, in decision block 730, whether the delay timer has expired. In response to determining that the delay timer has expired, method 700 returns to block 710 (FIG. 7A). In response to determining that the delay timer has not expired, a determination is made, in decision block 732, whether a manual triggering of the disabling access is received from the management console. In response to receiving the manual triggering from the management console, method 700 returns to block 710 (FIG. 7A). In response to not receiving a manual triggering from the management console, controller determines, in decision block 734, whether a manual cancellation is received from the management console. In response to not receiving a manual cancellation from the management console, method 700 returns to decision block 730. In response to receiving a manual cancellation from the management console, method 700 proceeds to block 736. In response to receiving a manual cancellation from the management console, method 700 includes enabling access via the one or more physical communication ports for any hot pluggable device, including devices engaged after detecting the presence of the unauthenticated person (block 736). Then method 700 ends.

In one or more embodiments, method 700 includes, in response to determining that the detected person is not authenticated, performing a security measure comprising a selected one or more of: (i) removing a locking key of a storage device of the at least one IT component to encrypt the storage media; (ii) locking an in-band communication network connection between the at least one IT component and a remote data center; and (iii) disabling an external physical communication port of the at least one IT component. Removing the locking key prevents later access to the storage if removed from the MDC.

In the above described flow chart of FIGS. 7A-C one or more of the methods may be embodied in OT controller 168 (FIG. 1) or controller 528 (FIG. 5) that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

According to one additional aspect of the disclosure, an MDC secures the at least one IT component in addition to, or as alternative to, autonomously disabling access via the one or more physical communication ports for any hot pluggable device engaged after detecting the presence of the unauthenticated person. In one or more embodiments, MDC includes a volumetric container having an interior enclosure. The MDC includes at least one IT component positioned within the volumetric container. The at least one IT component includes one or more of: (i) a storage device containing storage media; (ii) an in-band communication network connection with a data center external to the MDC and that supports transfers of computing workload and data; and (iii) a physical communication port. The MDC includes a security system having one or more sensors that detects a presence of a person in one or more of: (i) proximity to an exterior of the volumetric container; and (ii) an interior enclosure of the volumetric container. A personnel authentication device of the security system receives authentication credentials to verify authorized personnel. A controller of the security system is communicatively coupled to the at least one IT component, the one or more sensors, and the personnel authentication device. The controller executes a security platform application that enables the MDC to the at least one IT component. In particular, the controller determines, based on the one or more sensors, whether the presence of a person is detected. In response to determining that the presence of a person is detected, the controller determines, based on data received from the personnel authentication device, whether the detected person is authenticated. In response to determining that the detected person is not authenticated, the controller secures the at least one IT component by performing a security measure comprising a selected one or more of: (i) removing a locking key of the storage device to encrypt the storage media; (ii) locking the in-band communication network connection; and (iii) disabling the physical communication port.

In one or more embodiments, in response to determining that the detected person is not authenticated, the security platform application triggers the MDC to perform the security measure by enabling the controller to: (i) initiate a delay timer that provides a period of time before autonomously activating the selected one or more security measures to secure the at least one IT component; and (ii) notify a management console remote to the MDC to prompt a selected one of: (a) a manual triggering of the security measure from the management console; and (b) a manual cancellation of the security measure from the management console. In a particular embodiment, the security platform application triggers the MDC to perform the security measure by enabling the controller to: (i) associate the detected presence of the person to a defined minimum time for the person to access the one or more of: (a) the locking key of the storage device; (b) the in-band communication network connection; and (c) the physical communication port; and (ii) select the period of time for the delay timer that does not exceed the defined minimum time.

In one or more embodiments, in response to determining that the detected person is not authenticated, the security platform application enables the MDC to: (i) notify a management console remote to the MDC of the triggering of the security measure to protect the at least one IT component; and (ii) in response to receiving a manual cancellation from the management console, reverse the security measure applied to the at least one IT component.

In one or more embodiments, in response to securing the at least one IT component by performing the security measure, the controller enables the MDC to: (i) determine, based on the one or more sensors, whether the presence of the person is still detected; and (ii) reverse the security measure applied to the at least one IT component in response to determining that the presence of the person is no longer detected.

In one or more embodiments, in response to securing the at least one IT component by performing the security measure, the controller enables the MDC to: (i) determine, based on the one or more sensors, whether the presence of any person is detected; and (ii) in response to determining that the presence of a person is detected: (a) determine, based on data received from the personnel authentication device, whether the detected person is authenticated; and (b) reverse the security measure applied to the at least one IT component in response to determining that the detected person is authenticated.

In another embodiment, a method is provided of autonomously securing an MDC from an external malicious actor. In one or more embodiments, the method includes monitoring one or more sensors that detects a presence of a person in at least one of: (i) proximity to an exterior of a volumetric container of an MDC; and (ii) an interior enclosure of a volumetric container. The MDC includes at least one IT component positioned within the volumetric container. The MDC includes one or more of: (i) a storage device containing storage media; (ii) an in-band communication network connection with a data center external to the MDC and that supports transfers of computing workload and data; and (iii) a physical communication port. The method includes determining, based on the one or more sensors, whether the presence of a person is detected. In response to determining that the presence of a person is detected, the method includes determining, based on data received from a personnel authentication device, whether the detected person is authenticated. In response to determining that the detected person is not authenticated, the method includes securing the at least one IT component by performing a security measure comprising a selected one or more of: (i) removing a locking key of the storage device to encrypt the storage media; (ii) locking the in-band communication network connection; and (iii) disabling the physical communication port.

In one or more embodiments, in response to determining that the detected person is not authenticated, the method includes initiating a delay timer that provides a period of time before autonomously activating the selected one or more security measures to secure the at least one IT component. The method includes notifying a management console remote to the MDC to prompt a selected one of: (i) a manual triggering of the security measure from the management console; and (ii) a manual cancellation of the security measure from the management console. In a particular embodiment, the method includes associating the detected presence of the person to a defined minimum time for the person to access the one or more of: (i) the locking key of the storage device; (ii) the in-band communication network connection; and (iii) the physical communication port. The method includes selecting the period of time for the delay timer that does not exceed the defined minimum time.

In one or more embodiments, in response to determining that the detected person is not authenticated, the method includes notifying a management console remote to the MDC of the triggering of the security measure to protect the at least one IT component. In response to receiving a manual cancellation from the management console, the method includes reversing the security measure applied to the at least one IT component.

In one or more embodiments, in response to securing the at least one IT component by performing the security measure, the method includes determining, based on the one or more sensors, whether the presence of the person is still detected. The method includes reversing the security measure applied to the at least one IT component in response to determining that the presence of the person is no longer detected.

In one or more embodiments, in response to securing the at least one IT component by performing the security measure, the method includes determining, based on the one or more sensors, whether the presence of any person is detected. In response to determining that the presence of a person is detected, the method includes determining, based on data received from the personnel authentication device, whether the detected person is authenticated. The method includes reversing the security measure applied to the at least one IT component in response to determining that the detected person is authenticated.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A modular data center (MDC) comprising:
    a volumetric container having an interior enclosure;
    at least one information technology (IT) component positioned within the interior enclosure of the volumetric container and comprising one or more physical communication ports, each configured to receive a hot pluggable device containing memory that is addressable by the at least one IT component; and
    a security system comprising:
        one or more sensors that detects a presence of a person in at least one of: (i) proximity to an exterior of the volumetric container; and (ii) the interior enclosure of the volumetric container;
        a personnel authentication device that receives authentication credentials to verify authorized personnel; and
        a controller communicatively coupled to the at least one IT component, the one or more sensors, and the personnel authentication device, the controller executing a security platform application that enables the MDC to:
            determine, based on the one or more sensors, whether the presence of a person is detected; and
            in response to determining that the presence of a person is detected, determine, based on data received from the personnel authentication device, whether the detected person is authenticated; and
            in response to determining that the detected person is not authenticated:
                identify any hot pluggable device containing memory that is addressable by the at least one IT component and that is currently engaged to one of the one or more physical communication ports;
                selectively disable access via the one or more physical communication ports to which any hot pluggable device is engaged after detecting the presence of the unauthenticated person; and
                enable continued access to the at least one IT component by any identified hot pluggable device that was engaged before detecting the presence of the unauthenticated person.

2. The MDC of claim 1, wherein, in response to determining that the detected person is not authenticated, the security platform application triggers the MDC to selectively disable access via the one or more physical communication ports to hot pluggable devices by enabling the controller to:
    initiate a delay timer that provides a period of time before autonomously selectively disabling access via the one or more physical communication ports for any hot pluggable device engaged after detecting the presence of the unauthenticated person; and
    notify a management console remote to the MDC to prompt a selected one of: (i) a manual triggering of disabling access via the one or more physical communication ports; and (ii) a manual cancellation of the disabling access via the one or more physical communication ports.

3. The MDC of claim 2, wherein the security platform application triggers the MDC to disable the one or more physical communication ports by enabling the controller to:
    associate the detected presence of the person to a defined minimum time for the person to access the one or more of the physical communication ports; and
    select the period of time for the delay timer that does not exceed the defined minimum time.

4. The MDC of claim 1, wherein, in response to determining that the detected person is not authenticated, the security platform application enables the MDC to:
    notify a management console remote to the MDC of the triggering of the selective disabling access via the one or more physical communication ports for any hot pluggable device engaged after detecting the presence of the unauthenticated person; and
    in response to receiving a manual cancellation from the management console, enable access via the one or more physical communication ports for any hot pluggable device engaged after detecting the presence of the unauthenticated person.

5. The MDC of claim 1, wherein, in response to selectively disabling access via the one or more physical communication ports to which any hot pluggable device is engaged after detecting the presence of the unauthenticated person, the controller enables the MDC to:
    determine, based on the one or more sensors, whether the presence of the person is still detected; and
    reverse the security measure applied to the at least one IT component in response to determining that the presence of the person is no longer detected.

6. The MDC of claim 1, wherein, in response to selectively disabling access via the one or more physical communication ports to which any hot pluggable device is engaged after detecting the presence of the unauthenticated person, the controller enables the MDC to:
    determine, based on the one or more sensors, whether the presence of any person is detected; and in response to determining that the presence of a person is detected:
  determine, based on data received from the personnel authentication device, whether the detected person is authenticated; and
  reverse the security measure applied to the at least one IT component in response to determining that the detected person is authenticated.

7. The MDC of claim 1, wherein:
the at least one IT component comprises comprising one or more of: (i) a storage device containing storage media; (ii) an in-band communication network connection with a data center external to the MDC and that supports transfers of computing workload and data; and (iii) an external physical communication port;
in response to determining that the detected person is not authenticated, the security platform application enables the MDC to perform a security measure comprising a selected one or more of: (i) removing a locking key of the storage device to encrypt the storage media; (ii) locking the in-band communication network connection; and (iii) disabling the external physical communication port.

8. A modular data center (MDC) security system comprising:
  one or more sensors that detects a presence of a person in at least one of: (i) proximity to an exterior of a volumetric container of an MDC; and (ii) an interior enclosure of a volumetric container, the MDC comprising at least one information technology (IT) component positioned within the interior enclosure of the volumetric container and comprising one or more physical communication ports, each configured to receive a hot pluggable device containing memory that is addressable by the at least one IT component;
  a personnel authentication device that receives authentication credentials to verify authorized personnel; and
  a controller communicatively coupled to the at least one IT component, the one or more sensors, and the personnel authentication device, the controller executing a security platform application that enables the MDC to:
    determine, based on the one or more sensors, whether the presence of a person is detected; and
    in response to determining that the presence of a person is detected, determine, based on data received from the personnel authentication device, whether the detected person is authenticated; and
    in response to determining that the detected person is not authenticated:
      identify any hot pluggable device containing memory that is addressable by the at least one IT component and that is currently engaged to one of the one or more physical communication ports;
      selectively disable access via the one or more physical communication ports to which any hot pluggable device is engaged after detecting the presence of the unauthenticated person; and
      enable continued access to the at least one IT component by any identified hot pluggable device that was engaged before detecting the presence of the unauthenticated person.

9. The MDC security system of claim 8, wherein, in response to determining that the detected person is not authenticated, the security platform application triggers the MDC to selectively disable access via the one or more physical communication ports to hot pluggable devices by enabling the controller to:
  initiate a delay timer that provides a period of time before autonomously selectively disabling access via the one or more physical communication ports for any hot pluggable device engaged after detecting the presence of the unauthenticated person; and
  notify a management console remote to the MDC to prompt a selected one of: (i) a manual triggering of disabling access via the one or more physical communication ports; and (ii) a manual cancellation of the disabling access via the one or more physical communication ports.

10. The MDC security system of claim 9, wherein the security platform application triggers the MDC to disable the one or more physical communication ports by enabling the controller to:
  associate the detected presence of the person to a defined minimum time for the person to access the one or more of the physical communication ports; and
  select the period of time for the delay timer that does not exceed the defined minimum time.

11. The MDC security system of claim 8, wherein, in response to determining that the detected person is not authenticated, the security platform application enables the MDC to:
  notify a management console remote to the MDC of the triggering of the selective disabling access via the one or more physical communication ports for any hot pluggable device engaged after detecting the presence of the unauthenticated person; and
  in response to receiving a manual cancellation from the management console, enable access via the one or more physical communication ports for any hot pluggable device engaged after detecting the presence of the unauthenticated person.

12. The MDC security system of claim 8, wherein, in response to securing the at least one IT component by performing the security measure, the controller enables the MDC to:
  determine, based on the one or more sensors, whether the presence of the person is still detected; and
  reverse the security measure applied to the at least one IT component in response to determining that the presence of the person is no longer detected.

13. The MDC security system of claim 8, wherein, in response to securing the at least one IT component by performing the security measure, the controller enables the MDC to:
  determine, based on the one or more sensors, whether the presence of any person is detected; and
  in response to determining that the presence of a person is detected:
    determine, based on data received from the personnel authentication device, whether the detected person is authenticated; and
    reverse the security measure applied to the at least one IT component in response to determining that the detected person is authenticated.

14. A method of autonomously securing a modular data center (MDC) from a detected external threat by disabling physical communication ports, the method comprising:
  monitoring one or more sensors that detects a presence of a person in at least one of: (i) proximity to an exterior of a volumetric container of an MDC; and (ii) an interior enclosure of a volumetric container, the MDC comprising at least one information technology (IT) component positioned within the volumetric container and comprising one or more physical communication ports, each configured to receive a hot pluggable device containing memory that is addressable by the at least one IT component;

determining, based on the one or more sensors, whether the presence of a person is detected; and in response to determining that the presence of a person is detected: determining, based on data received from the personnel authentication device, whether the detected person is authenticated; and in response to determining that the detected person is not authenticated:
  identifying any hot pluggable device containing memory that is addressable by the at least one IT component and that is currently engaged to one of the one or more physical communication ports;
  selectively disabling access via the one or more physical communication ports to which any hot pluggable device is engaged after detecting the presence of the unauthenticated person; and
  enabling continued access to the at least one IT component by any identified hot pluggable device that was engaged before detecting the presence of the unauthenticated person.

15. The method of claim 14, wherein, triggering the MDC to selectively disable access via the one or more physical communication ports to hot pluggable devices comprises:
  initiating a delay timer that provides a period of time before autonomously selectively disabling access via the one or more physical communication ports for any hot pluggable device engaged after detecting the presence of the unauthenticated person; and
  notifying a management console remote to the MDC to prompt a selected one of: (i) a manual triggering of disabling access via the one or more physical communication ports; and (ii) a manual cancellation of the disabling access via the one or more physical communication ports.

16. The method of claim 15, wherein triggering the MDC to disable the one or more physical communication ports comprises:
  associating the detected presence of the person to a defined minimum time for the person to access the one or more of the physical communication ports; and
  selecting the period of time for the delay timer that does not exceed the defined minimum time.

17. The method of claim 14, further comprising:
in response to determining that the detected person is not authenticated:
  notifying a management console remote to the MDC of the triggering of the selective disabling access via the one or more physical communication ports for any hot pluggable device engaged after detecting the presence of the unauthenticated person; and
  in response to receiving a manual cancellation from the management console, enabling access via the one or more physical communication ports for any hot pluggable device engaged after detecting the presence of the unauthenticated person.

18. The method of claim 14, further comprising:
in response to securing the at least one IT component by performing the security measure:
  determining, based on the one or more sensors, whether the presence of the person is still detected; and
  enabling access via the one or more physical communication ports for any hot pluggable device engaged after detecting the presence of the unauthenticated person in response to determining that the presence of the person is no longer detected.

19. The method of claim 14, further comprising:
in response to securing the at least one IT component by performing the security measure:
  determining, based on the one or more sensors, whether the presence of any person is detected; and
  in response to determining that the presence of a person is detected:
    determining, based on data received from the personnel authentication device, whether the detected person is authenticated; and
    enabling access via the one or more physical communication ports for any hot pluggable device engaged after detecting the presence of the unauthenticated person in response to determining that the detected person is authenticated.

20. The method of claim 14, further comprising, in response to determining that the detected person is not authenticated, performing a security measure comprising a selected one or more of:
  (i) removing a locking key of a storage device of the at least one IT component to encrypt the storage media; (ii) locking an in-band communication network connection between the at least one IT component and a remote data center; and (iii) disabling an external physical communication port of the at least one IT component.

* * * * *